US006988049B1

(12) United States Patent
Wirtz et al.

(10) Patent No.: US 6,988,049 B1
(45) Date of Patent: Jan. 17, 2006

(54) APPARATUS AND METHOD FOR PROVIDING TRUE GEODETIC COORDINATES

(75) Inventors: Michael Mathew Wirtz, Ridgecrest, CA (US); Michael Robert Havlin, Ridgecrest, CA (US); Diane Sue Tilley, Inyokern, CA (US); Frank Joseph Modlinski, Ridgecrest, CA (US); Michael David Thomas, Ridgecrest, CA (US); Louis Christopher Miller, Ridgecrest, CA (US); William Rodney Ditzler, Ridgecrest, CA (US); James Edward McKnight, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 126 days.

(21) Appl. No.: 10/816,581

(22) Filed: Mar. 25, 2004

Related U.S. Application Data

(60) Provisional application No. 60/540,901, filed on Jan. 28, 2004.

(51) Int. Cl.
*G01C 17/00* (2006.01)

(52) U.S. Cl. .................................................... 702/150

(58) Field of Classification Search ..................... None
See application file for complete search history.

(56) References Cited

U.S. PATENT DOCUMENTS

| | | | | |
|---|---|---|---|---|
| 4,949,089 A | | 8/1990 | Ruszkowski | |
| 5,751,612 A | * | 5/1998 | Donovan et al. | 703/6 |
| 5,987,380 A | | 11/1999 | Backman et al. | |
| 6,083,353 A | | 7/2000 | Alexander, Jr. | |
| 6,304,210 B1 | * | 10/2001 | Allison et al. | 342/357.08 |

* cited by examiner

*Primary Examiner*—Michael Nghiem
*Assistant Examiner*—C. Dieu Khuu
(74) *Attorney, Agent, or Firm*—Laura R. Foster

(57) ABSTRACT

An embodiment of the present invention utilizes the Reference Point Method (RPM). RPM generates a local magnetic declination variance that is exact for the location of the OP, utilizing an optical stereo imagery database. RPM functions to determine true geodetic coordinates of a target position not available to be displayed in an image database, such as, for example, movable equipment.

24 Claims, 7 Drawing Sheets

FIG. 2D
DPPDB Exploitation Tool - Image Segement [WGS-84 CE: meters and LE: meters]
File Command Graphics Markers Tools Help
Extract...
Estimate...
Markers...
L to R R to L Pixel Ratio: 1:1
Left Chip View:
NUM
Estimate New Target Position
Geodetic MGRS
Own Position (OP): N035:41:10.10 W117:40:42.94 645.75 Meters
Reference Point (RP): N035:40:57.77 W117:40:40.14 647.65 Meters
Enter Bearing from OP to RP (MAGNETIC): 175 Degrees
Enter Bearing from OP to Target (MAGNETIC): 192 Degrees
Enter Distance between OP and Target: 2158 Feet
Enter Inclination Angle between OP and Target: 0.5 Degrees
Local Magnetic Declination: -5.50 Degrees
Target Position: N035:40:48.90 W117:40:45.90 2137.45 Feet
Calculate
Accept
Rechip
Cancel

APPARATUS AND METHOD FOR PROVIDING TRUE GEODETIC COORDINATES

CROSS-REFERENCE TO RELATED APPLICATIONS

This application claims priority under 35 U.S.C. §119(e) of U.S. provisional application having Ser. No. 60/540,901 filed on Jan. 28, 2004, which is hereby incorporated by reference. This application is co-pending and was concurrently filed with U.S. patent application having Navy Case No. 84647.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND OF THE INVENTION

For weapons systems to be effective, the location of a target must be known in a coordinate system, such as longitude, latitude and elevation. These coordinates must be extremely accurate in order to properly guide a weapon and to avoid collateral damage.

In the past attempts have been made to improve the determination of coordinates. Often this includes teams of observers equipped with various and cumbersome portable systems to either determine target position coordinates or to designate the target by laser illumination in the case of laser homing systems. Despite these advances teams are still equipped with maps and are required to perform calculations in the field.

In addition, determining a true bearing to a target or a location is a concern due to the difference between magnetic readings of raw and true directions. The difference between true north and magnetic north at a location is called magnetic declination. Correction of magnetic declination is extremely important as the difference in degrees on a 0–360 degree scale between the bearing to the magnetic north pole and the bearing to the geographic north pole, or true North Pole in many areas of the earth may amount up to about 30 degrees and above. Due to declination, maps are printed marked with the local values of declination.

Known instruments for aiding in the use of maps, are very limited in their usefulness, particularly for military purposes. One such limitation is that they are applicable to a single scale map because each instrument is calibrated for use with one of several military scaled maps, as for example 1:25,000, 1:50,000 or 1:125,000. Another limitation of known instruments, particularly for military uses, is that the user has a need in the effective use of a map to make arithmatical computations and, therefore, military recruits must undergo extensive training in map reading. Some of the arithmatical computations involve converting magnetic azimuths to grid azimuths and conversion to back azimuths when it is desired to locate on the map an unknown point from two known points, which functions are referred to as "resection" and "intersection." Also, in determining the total distance along a sinuous path, e.g. a road or railroad track, the user must add the straight portions of the path between the curved portions. A further limitation of known map reading devices is that the artillery uses instruments in which angular directions are measured in mils rather than degrees for more accurate aiming of the weapons. Thus, artillery personnel and those spotting for artillery units must have special map reading and plotting instruments. Obviously, where in the use of heretofore known map reading instruments computations are required, the need for paper and/or a writing implement poses a problem, particularly under actual field conditions where paper and a writing tool is not, always available to the map user. Also, map reading and plotting instruments of heretofore known types require the user to draw lines on a map and, in absence of available paper, the user may use the map for making computations. These writings on a map lead to short map life and leaves marks which, even if erased, are visible or can be made visible and may give aid to an enemy if the map is captured.

Determining target coordinates in the field is cumbersome and prone to error using the methods described. Accordingly, there is a need for rapidly calculated, accurate true coordinates, generated without maps and hand calculations, which may be used for various applications including but not limited to directing weapons to a target.

SUMMARY OF THE INVENTION

An embodiment of the invention includes an apparatus for providing true geodetic coordinates of a target position (TGT) using an image database including a portable personal computing device having means to accept input, and output data and commands and a processor configured to execute a process corresponding to the input, output data and commands. The process includes accepting input of true geodetic coordinates of an own position (OP), accepting input of raw coordinates of a reference point (RP), and accepting input of true coordinates of RP obtained from the image database. The process further includes computing exact local magnetic declination variance between the raw coordinates of RP and the true geodetic coordinates of RP, accepting input of raw coordinates, inclination and range of said target position (TGT), computing the true geodetic coordinates of TGT utilizing the exact local magnetic declination variance, and outputting the true geodetic coordinates, inclination and range of the TGT.

Another embodiment of the invention includes a method for providing true geodetic coordinates of a target position (TGT) using an image database including providing a portable personal computing device having means to accept input, and output data and commands, providing a processor configured to process the input and the commands. The process includes, accepting input of true geodetic coordinates of an own position (OP), accepting input of raw coordinates of a reference point (RP), accepting true geodetic coordinates of the RP, the true coordinates of RP being obtained from the image database, and computing exact local magnetic declination variance between the raw coordinates of RP and the true geodetic coordinates of RP. The process further includes accepting input of raw coordinates, inclination and range of the target position (TGT), computing the true geodetic coordinates of TGT utilizing the exact local magnetic declination variance, and outputting the true geodetic coordinates, inclination and range of TGT.

Another embodiment of the invention includes a computer program product, embodied on a computer readable medium, for providing true geodetic coordinates of a target position (TGT) using an image database including a computer code embedded in a portable personal computer (PC) having a computer program code causing the PC to interface with a user and with other electronic medium, computer code for accepting input and commands and for outputting data, computer code to execute a process corresponding to the input and commands. The process includes, accepting input of true geodetic coordinates of an own position (OP), accepting input of raw coordinates of a reference point (RP), accepting true geodetic coordinates of the RP, the true coordinates of RP being obtained from the image database, and computing exact local magnetic declination variance between the raw coordinates of RP and the true geodetic coordinates of RP. The process further includes accepting input of raw coordinates, inclination and range of the target position (TGT), computing the true geodetic coordinates of TGT utilizing the exact local magnetic declination variance, and outputting the true geodetic coordinates, inclination and range of TGT.

DESCRIPTION OF EMBODIMENTS OF THE INVENTION

Figure 1:
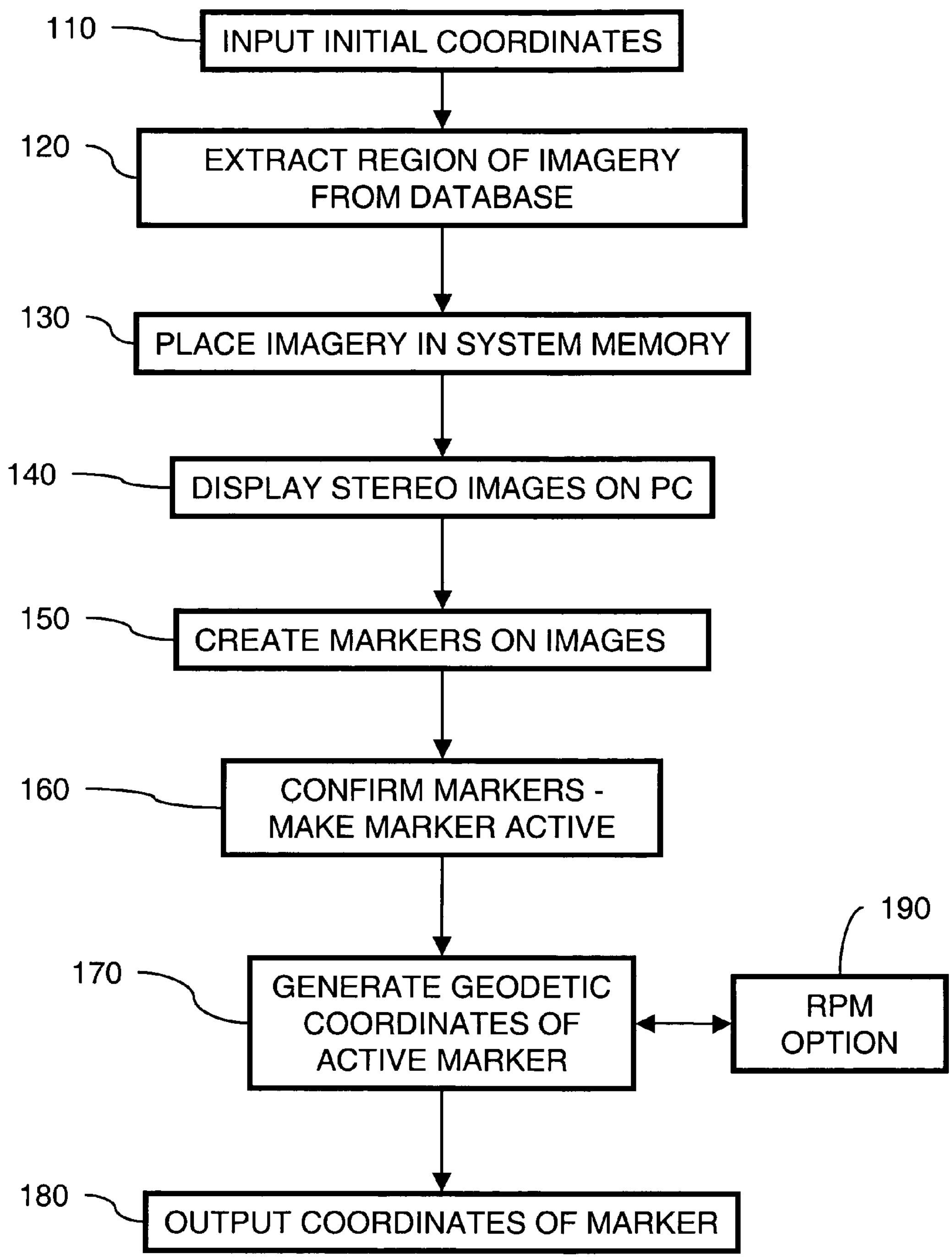
FIG. 1 is a functional flowchart of the basic functions of the Precision Strike Suite (PSS) according to an embodiment of the invention.

Embodiments of the present invention include an apparatus and method for providing true geodetic coordinates for locations, which may be used in targeting of weapons. It should be understood that the examples and embodiments described herein are for illustrative purposes only and that various modifications or changes in light thereof will be suggested to persons skilled in the art and are to be included within the spirit and purview of this application and the scope of the appended claims.

An embodiment of the invention includes a rugged hand-held personal computer (PC) such as, for example Panasonic Toughbooks™ CF-18, CF-27, CF-34, CF-50, CF-72; IBM A-21P, A-31P, and Dell Inspiron™ laptops, housed in portable, tough, resilient cases. The PC runs the Precision Strike Suite (PSS) and the Reference Point Method (RPM) programs that may be windows based input and display programs that provide a user friendly interface to receive input and display results. The PC may receive and input information via other means such as, for example, USB/serial ports, or a touch screen. Those of ordinary skill in the art will readily acknowledge that changes and codification may be made to the touch screen, keyboard or other input/output options without departing or diverting from the scope of embodiments of the present invention.

Generally, a portable personal computer (PC) system includes a bus and/or other communication mechanisms for communicating information, and a processor coupled with the bus for processing information. The PC also includes a main memory means such as, for example, random access memory (RAM) or other dynamic storage device, coupled to the bus for storing information and instructions to be executed by the processor. Main memory also may be used for storing temporary variable or other intermediate information during execution of instructions to be executed by the processor.

The PC further includes a read only memory (ROM) and/or other static storage device coupled to the bus for storing static information and instructions for processor. A storage device such as, for example, a magnetic disk or optical disk, is provided and coupled to the bus for storing information and instructions. The PC may be coupled via the bus to a display means, such as, for example, a cathode ray tube (CRT), for displaying information to a computer user. An input device, including alphanumeric and other keys, is coupled to the bus for communicating information and command selections to the processor. Another type of input user device is cursor control, such as, for example, a mouse, an optical mouse, a trackball, touch screen, touch pad, or cursor direction keys for communicating direction information and command selections to the processor and for controlling cursor movement on the display.

Precision Strike Suite (PSS)

An embodiment of the present invention utilizes the Precision Strike Suite (PSS). PSS performs tasks including but not limited to the generation of true geodetic coordinates and elevation of an item or a location, utilizing a stereo image database. PSS is loaded onto a PC along with a stereo image database, such as, for example, the Digital Point Positioning Database (DPPDB). DPPDB is a stereo image based product having parametric support data, compressed reference graphics and high resolution optical imagery stereo pair sets each covering a 60×60 nautical mile area. PSS generates the precise true geodetic coordinates and elevation of any identifiable point or target contained within the area provided by the image database. In an embodiment of the invention PSS is written in Borland language and operates as a windows based application. But those skilled in the art would recognize that PSS may be written in other computer languages without departing from the embodiments of the invention.

Figure 2A:
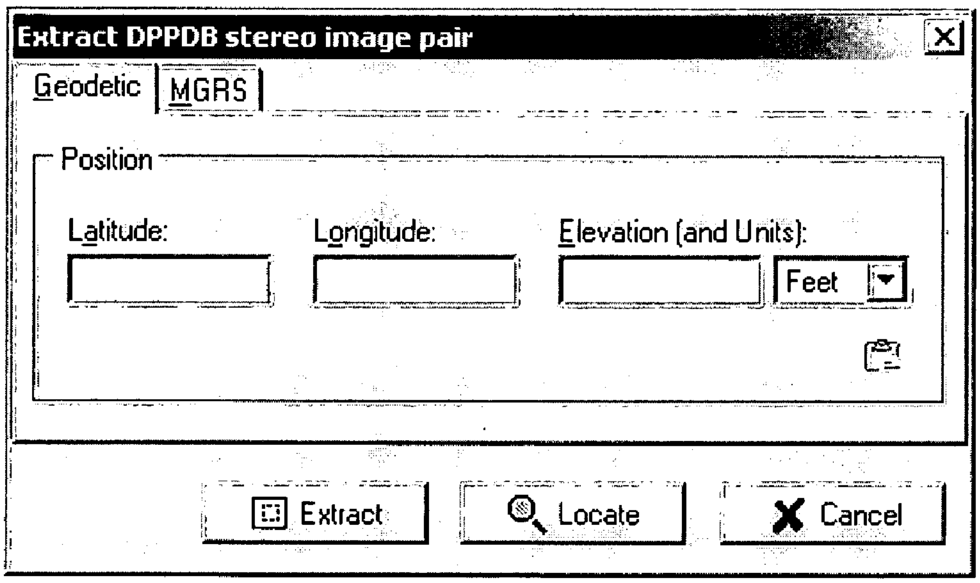
FIGS. 2A–2D are screen captures of displays generated by embodiments of PSS.

Referring to the drawings, wherein elements are identified by numbers and like elements are identified by like numbers throughout the figures, FIG. 1 shows a functional flowchart of the basic functions of the PSS program. In an embodiment of the present invention, an initial coordinate for the area of interest is inputted 110. This may be the user's "own position" (OP) or any other location. According to an embodiment of the present invention, this initial coordinate may be in the form of the World Geodetic Survey 1984 (WGS-84) or a Military Grid reference System (MGRS). This initial coordinate may be obtained from one of numerous sources known in the art, for example maps, charts, or Global Positioning System (GPS) receivers such as, for example, Precise Lightweight GPS Receiver (PLGR) or eTrex®. In other embodiments of the invention sources of the initial coordinates include but are not limited to a tactical image from sensors (such as, for example, Advanced Targeting Forward Looking Radar (ATFLIR)), from targeting pods (such as, for example, Low Altitude Navigation and Targeting Infrared for Night (LANTIRN)), or mapping systems (such as, for example, FalconView). The initial coordinate is entered as a geodetic location key within the PSS GUI extract dialog box. See FIG. 2A. This initial coordinate may be entered in a variety of ways including, but not limited to, manually, via keyboard, transferred electronically (such as, for example, from a handheld GPS system), or internally between applications such as, for example, from an XML application.

PSS searches through the stereo image database installed on the PC for an image that encompasses the initial coordinate. PSS extracts the set of digital stereo images 120 from the database. PSS places the digital stereo imagery and the specific support data for the imagery in an accessible form in the PC system memory 130 and displays them 140 as first and second side by side images in parallel windows on the PC screen and centered on the initial coordinate. The PSS displays how close the imagery center is to the initial coordinate. (The coordinates may differ due to rounding errors or differences in resolution size, etc.) The stereo images may be centered or scrolled around using buttons on the windows interface, "grabby hand", or by other display control means known in the art.

Figure 2B:
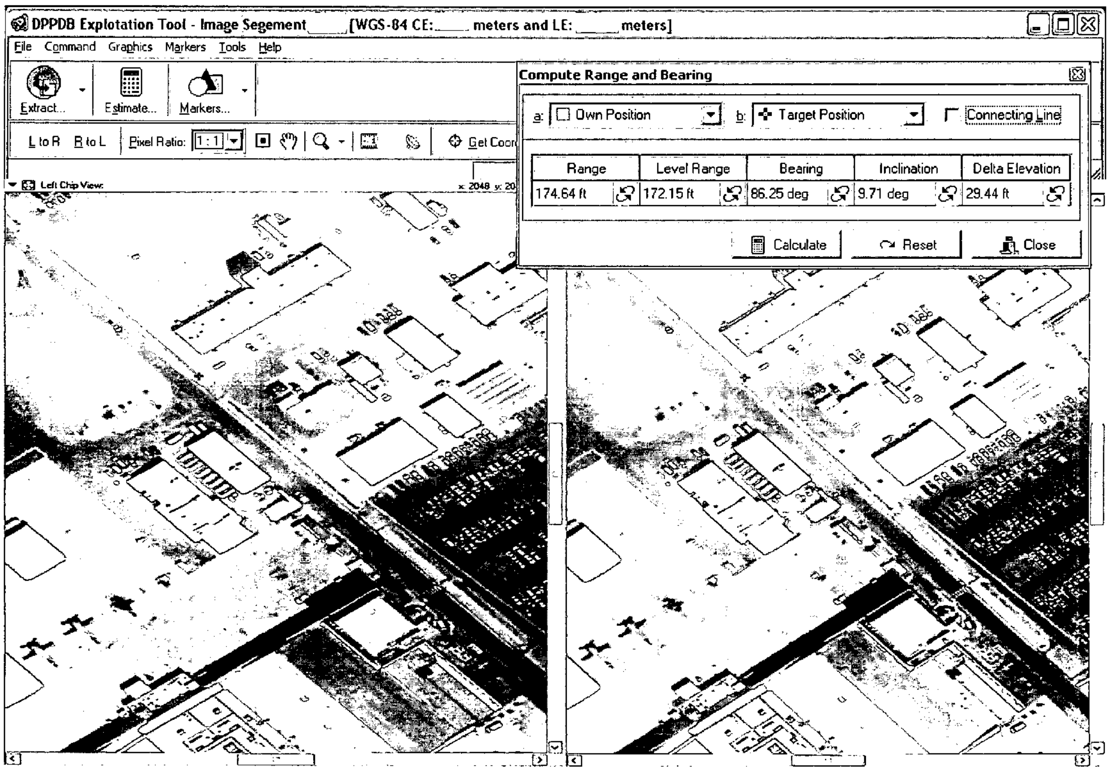

Subsequently, in an embodiment of the present invention, locations may be on the stereo images by using a movable screen cursor available in each image and clicking on it. This is known in the art as creating a "marker" 150. When a marker is created on the first of the set of images, PSS may be requested to autocorrelate the cursor location and designate the exact same cursor location in the second of the set of images and match the first marker. The autocorrelation uses a complex edge-gradient frequency domain correlation at full resolution of the left and right stereo pair. The last marker modified is the "active" marker. This active marker may be a "target position" (TGT), a "reference position" (RP), or the "own position" (OP). See FIG. 2B. This location is accepted or adjusted as necessary 160. It is noteworthy that the PSS will display a message if the coordinates sought are OP in case there is an error for safety reasons. The markers are shown on the display of the stereo imagery set. They may be designated with different colors or shapes or made invisible on the screen via drop down menus as is well known in the art.

Figure 2C:
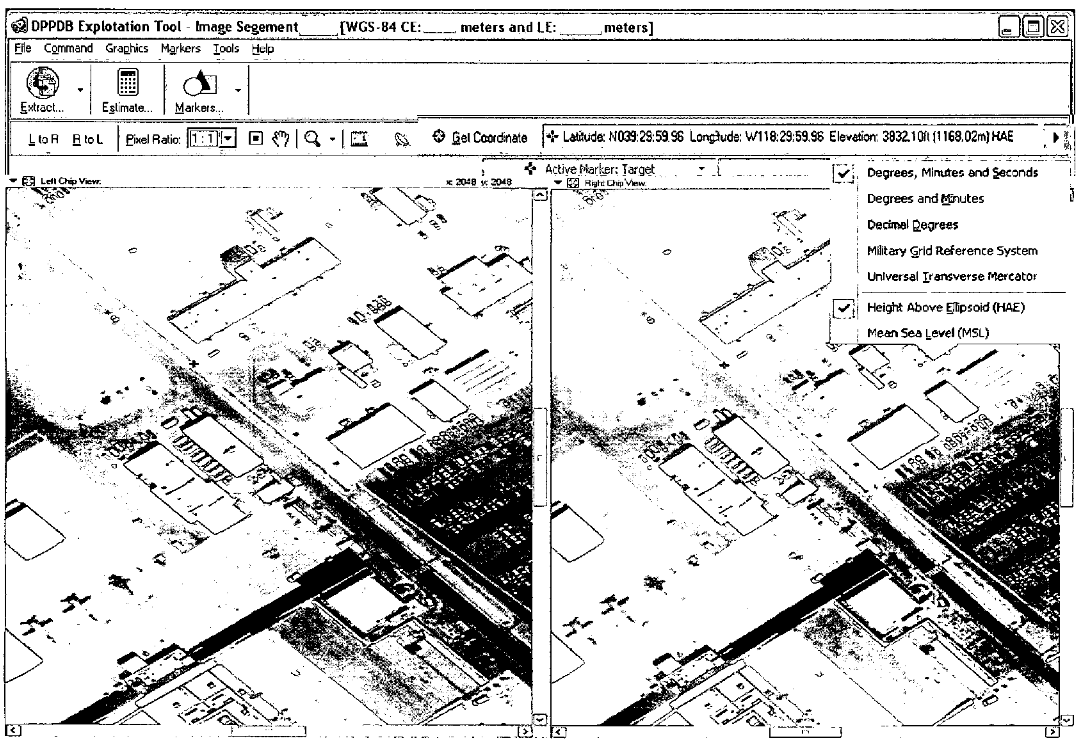

After markers have been set the "Get Coordinate" button on PSS 170 is selected to generate a geodetic coordinate for the active marker. PSS produces the exact geodetic coordinates and elevation in a chosen reference system (such as, for example, World Geodetic System 1984 (WGS-84) or Miltary Grid Reference System (MGRS)). See FIG. 2C. The format of the coordinates may be changed via selections on drop down menus. This output may be displayed or electronically transmitted to other equipment or to other remotely located personnel or command center 180. This transmission or output may be effected by many output means including, but not limited, to via USB/serial connections, via a storage medium, via PCMCIA modem card and radio, and high speed data links.

Figure 2D:

Once the PSS has markers selected there are many options available. Some embodiments include, but are not limited to: estimating a coordinate of a point based on the coordinates of two known reference points; calculating range, level range, bearing, inclination, or delta elevation between any two markers in various units such as for example, feet, meters, or degrees; or calculating coordinates of a new target position by entering the range and bearing to TGT measured from OP. See FIG. 2D. In an embodiment the TGT coordinates may be corrected for magnetic variance using the exact local magnetic declination variance values stored in tables on the PC or generated by the Reference Point Method (RPM) 190 (described below).

In addition many user preferences may be set under a drop down tools menu including but not limited to, startup coordinates and/or, input/output options. The display may be optimized via a graphics menu to add features including but not limited to displaying a compass, displaying coordinates on the stereo images, rotating imagery to show North up, and/or displaying radius rings around TGT. As previously noted, PSS may interact with other programs using the "Open XML file" command from the File drop down menu (XML stands for eXtensible Markup Language). Information such actual coordinate, coordinate type (friend or target), and coordinate accuracy (pedigree of how coordinate was derived) may be transferred between PSS and other programs via this option.

Another embodiment of the invention includes a method for providing true geodetic coordinates of a target position using an optical stereo image database including providing a portable personal computing device (PC) having means to accept input and commands, means to output, a memory means, and means to display a set of optical stereo images, side by side, from an optical stereo image database, including a first image and a second image, and providing a processor configured to maintain a stereo image database including optical stereo imagery with corresponding geodetic data, and to execute a process corresponding to input and commands. The process includes accepting input of geodetic coordinates of an own position (OP), extracting the set of stereo images centered around the OP from the stereo image database and storing the images in the memory means. The process further includes displaying the stereo images on the display means and displaying a first marker corresponding to the OP on each of the first and second images, accepting input of target position (TGT) on the first stereo image and displaying a second marker corresponding to the TGT on the first image, autocorrelating and displaying the second marker corresponding to the TGT on the second stereo image. The process further includes receiving approval of the selection of TGT, computing the true geodetic coordinates and elevation for the TGT including correcting the geodetic data from the optical stereo image database for local magnetic declination variance, and outputting the true geodetic coordinates, inclination and range of TGT.

Another embodiment of the invention includes a computer program product, embodied on a computer readable medium, for providing true geodetic coordinates of a target position using an optical stereo image database including a computer code embedded in a portable personal computer (PC) having a computer program code causing the PC to interface with a user and with other electronic medium, a computer code for receiving input and commands and for outputting data, a computer code for displaying a set stereo images side by side, from the optical stereo image database, having a first image and a second image, a computer code for configuring a processor to maintain the optical stereo image database including at least one set of the stereo images with corresponding geodetic data, and a computer code to execute a process corresponding to the input and commands. The process includes accepting input of geodetic coordinates of an own position (OP), extracting the set of stereo images centered around the OP from the stereo image database and storing the images in the memory means. The process further includes displaying the stereo images on the display means and displaying a first marker corresponding to the OP on each of the first and second images, accepting input of target position (TGT) on the first stereo image and displaying a second marker corresponding to the TGT on the first image, autocorrelating and displaying the second marker corresponding to the TGT on the second stereo image. The process further includes receiving approval of the selection of TGT, computing the true geodetic coordinates and elevation for the TGT including correcting the geodetic data from the optical stereo image database for local magnetic declination variance, and outputting the true geodetic coordinates, inclination and range of TGT.

Reference Point Method

Figure 3:
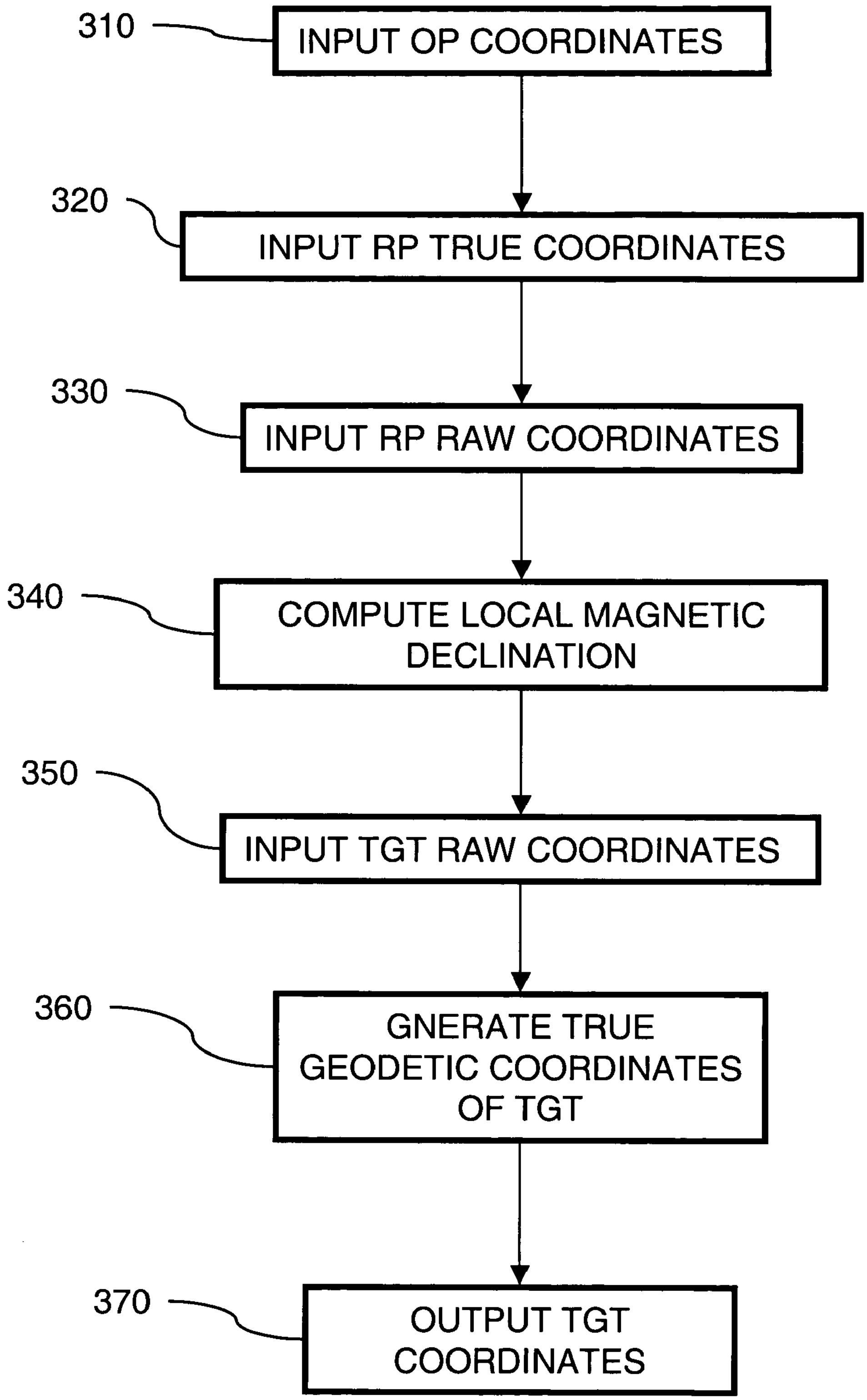
FIG. 3 is a functional flowchart of the basic functions of the Reference Point Method (RPM) according to an embodiment of the invention

FIG. 3 shows a functional flowchart of the basic functions of the RPM program. Reference Point Method (RPM) is written in C++ Borland Builder 6 for laptops and Microsoft Visual Studio.Net for Windows CE devices such as, for example Compaq (HP) IPAQ™ model 3650 handheld PCs. RPM is installed on a separate handheld PC or operates alternatively in the PSS program (described above). RPM functions to determine true geodetic coordinates of a TGT not available to be displayed in an image database, such as, for example, movable equipment. RPM generates a local magnetic declination variance that is exact for the location of the OP, utilizing an optical stereo imagery database.

In an embodiment of the invention the "own position" (OP) is obtained via various means such as, for example, a hand held GPS, map, or by the PSS. The OP coordinates are inputted 310 into a portable PC in the RPM software or marked as part of the operation of the PSS (discussed above).

Using various means described above, the true coordinates of a "reference point" (RP) are determined. The RP selected shall be a landmark that can be seen in the stereo imagery database and that can be seen through a laser range finder (LRF) from the OP. These coordinates are entered 320 in the RPM dialog box (or are marked as RP in the PSS).

A LRF is fired from OP to RP. The LRF provides the range, bearing and inclination angle from OP to RP in raw coordinates. The raw coordinates of RP are inputted 330 in the RPM dialog box (or entered as magnetic coordinates in PSS). RPM compares the true coordinates of RP and the raw coordinates of RP and computes the exact local magnetic declination variance for the OP 340.

Figure 4:
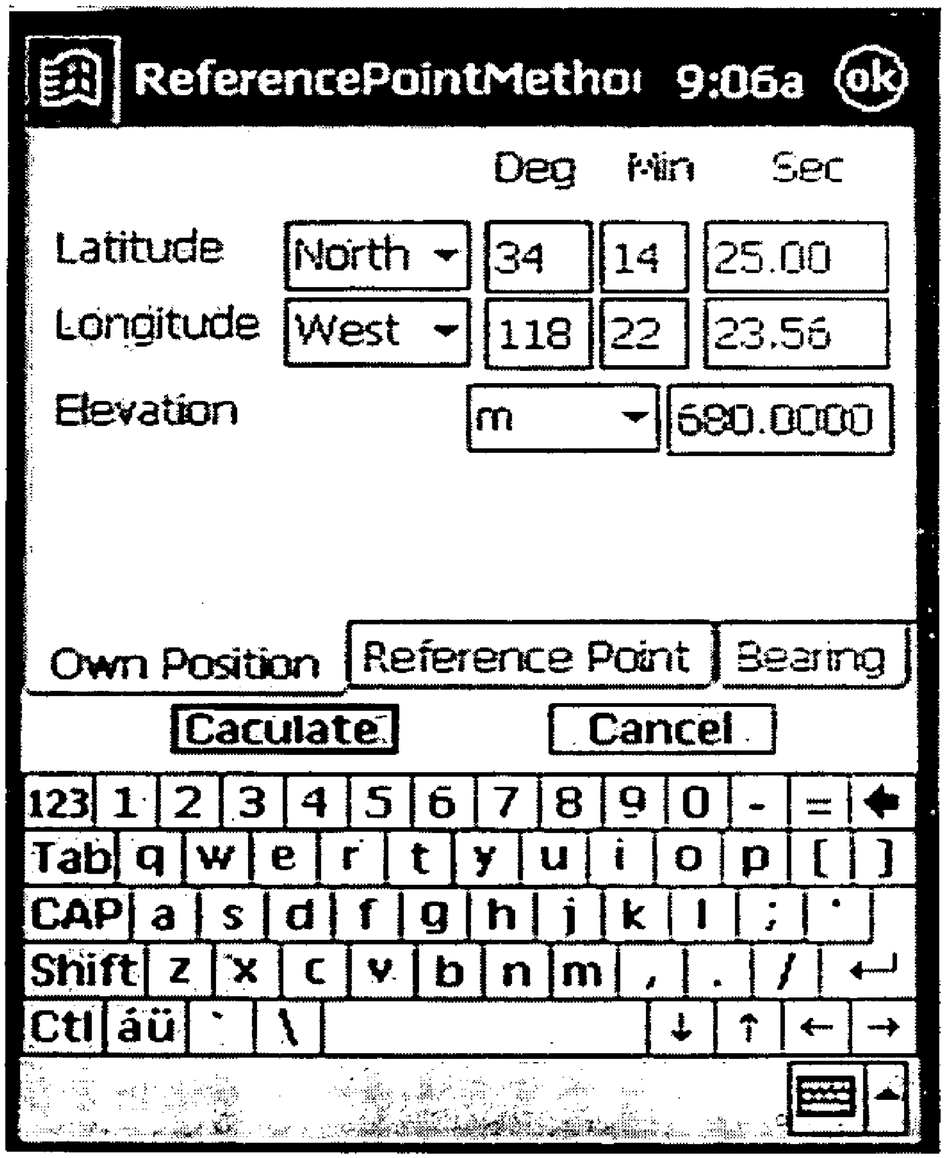
FIG. 4 is a screen capture of a display generated by an embodiment of RPM on a personal computing device.

A LRF is fired from OP to "target position" (TGT). The LRF provides the range, bearing and inclination angle from OP to TGT in raw coordinates. The raw coordinates of TGT are entered in the RPM dialog box (or entered as magnetic coordinates in PSS) 350. RPM generates the true geodetic coordinates of TGT using the local magnetic declination computed previously and the inclination and range data from the LRF 360. See FIG. 4. The true coordinates of TGT may be outputted, displayed or electronically transmitted to other equipment or to other remotely located personnel or command center 370. This transmission or output may be effected by many output means including, but not limited to, via USB/serial connections, via a storage medium, via PCMCIA modem card and radio, and high speed data links.

In embodiments of the present invention the PSS and RPM programs are embodied on computer readable medium. A computed-readable medium is any article of manufacture that contains data that can be read by a computer. Common forms of computer-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EPROM, any other memory chip or cartridge, or any other medium from which a computer can read. In addition, those skilled in the art would recognize that input and output in embodiments of the invention may occur via direct electronic means (such as, for example, by cable or by radio signal) rather than by direct user actions (such as, for example, keypad or touchpad entries).

Another embodiment of the invention includes a method for providing true geodetic coordinates of a target position (TGT) using an image database including providing a portable personal computing device having means to accept input, and output data and commands, providing a processor configured to process the input and the commands. The process includes, accepting input of true geodetic coordinates of an own position (OP), accepting input of raw coordinates of a reference point (RP), accepting true geodetic coordinates of the RP, the true coordinates of RP being obtained from the image database, and computing exact local magnetic declination variance between the raw coordinates of RP and the true geodetic coordinates of RP. The process further includes accepting input of raw coordinates, inclination and range of the target position (TGT), computing the true geodetic coordinates of TGT utilizing the exact local magnetic declination variance, and outputting the true geodetic coordinates, inclination and range of TGT.

Another embodiment of the invention includes a computer program product, embodied on a computer readable medium, for providing true geodetic coordinates of a target position (TGT) using an image database including a computer code embedded in a portable personal computer (PC) having a computer program code causing the PC to interface with a user and with other electronic medium, computer code for accepting input and commands and for outputting data, computer code to execute a process corresponding to the input and commands. The process includes, accepting input of true geodetic coordinates of an own position (OP), accepting input of raw coordinates of a reference point (RP), accepting true geodetic coordinates of the RP, the true coordinates of RP being obtained from the image database, and computing exact local magnetic declination variance between the raw coordinates of RP and the true geodetic coordinates of RP. The process further includes accepting input of raw coordinates, inclination and range of the target position (TGT), computing the true geodetic coordinates of TGT utilizing the exact local magnetic declination variance, and outputting the true geodetic coordinates, inclination and range of TGT.

Although the description above contains much specificity, this should not be construed as limiting the scope of the invention but as merely providing an illustration of embodiments of the present invention. Thus the scope of this invention should be determined by the appended claims and their legal equivalents.

What is claimed is:

1. An apparatus for providing true geodetic coordinates of a target position (TGT) using an image database comprising:

a portable personal computing device having means to accept input, and output data and commands; and, a processor configured to execute a process corresponding to said input, output data and commands, said process comprising, accepting input of true geodetic coordinates of an own position (OP);

accepting input of raw coordinates of a reference point (RP);

accepting input of true coordinates of RP from user, said true coordinates of RP being obtained from said image database;

computing exact local magnetic declination variance between said raw coordinates of RP and said true geodetic coordinates of RP;

accepting input of raw coordinates, inclination and range of said target position (TGT);

computing the true geodetic coordinates of TGT utilizing the exact local magnetic declination variance; and outputting the true geodetic coordinates, inclination and range of the TGT.

2. The apparatus of claim 1 wherein said portable personal computing device comprises a Compaq (Hewlett-Packard) IPAQ™ model 3650.

3. The apparatus of claim 1 wherein said image database comprises the Digital Point Positioning Database (DPPDB).

4. The apparatus of claim 1 wherein said true geodetic coordinates of said own position (OP) are obtained from said image database, a Global Positioning System (GPS) receiver, an Advanced Targeting Forward Looking Radar (ATFLIR) image, a Low Altitude Navigation and Targeting Infrared for Night (LANTIRN) pod, or the FalconView mapping system.

5. The apparatus of claim 1 wherein said geodetic coordinates are in the World Geodetic System 1984 (WGS-84), the Military Grid Reference System (MGRS), or like reference system.

6. The apparatus of claim 1 wherein said raw coordinates of a reference point (RP) and said raw coordinates of target (TGT) are obtained utilizing a Laser Range Finder (LRF).

7. The apparatus of claim 1 wherein said true coordinates of OP and RP are obtained from said image database.

8. The apparatus of claim 1 wherein said true coordinates of OP and RP are obtained from said image database by utilizing the Precision Strike Suite (PSS).

9. A method for providing true geodetic coordinates of a target position (TGT) using an image database comprising:

providing a portable personal computing device having means to accept input, and output data and commands;

providing a processor configured to process said input and said commands, said process comprising, accepting input of true geodetic coordinates of an own position (OP);

accepting input of raw coordinates of a reference point (RP);

accepting true geodetic coordinates of the RP, said true coordinates of RP being obtained from said image database;

computing exact local magnetic declination variance between said raw coordinates of RP and said true geodetic coordinates of RP;

accepting input of raw coordinates, inclination and range of said target position (TGT);

computing the true geodetic coordinates of TGT utilizing the exact local magnetic declination variance; and outputting the true geodetic coordinates, inclination and range of TGT.

10. The method of claim 9 wherein said portable personal computing device comprises a Compaq (Hewlett-Packard) IPAQ™ model 3650.

11. The method of claim 9 wherein said image database comprises the Digital Point Positioning Database (DPPDB).

12. The method of claim 9 wherein said true geodetic coordinates of said own position (OP) are obtained from said image database, a Global Positioning System (GPS) receiver, an ATFLIR image, a Low Altitude Navigation and Targeting Infrared for Night (LANTIRN) pod, or the FalconView mapping system.

13. The method of claim 9 wherein said geodetic coordinates are in the World Geodetic System 1984 (WGS-84), the Miltary Grid Reference System (MGRS), or like reference system.

14. The method of claim 9 wherein said raw coordinates of a Reference Point (RP) and said raw coordinates of target (TGT) are obtained utilizing a Laser Range Finder (LRF).

15. The method of claim 9 wherein said true coordinates of OP and RP are obtained from said image database.

16. The method of claim 9 wherein said true coordinates of OP and RP are obtained from said image database by utilizing the Precision Strike Suite (PSS).

17. A computer program product, embodied on a computer readable medium, for providing true geodetic coordinates of a target position (TGT) using an image database comprising:

computer code embedded in a portable personal computer (PC) having a computer program code causing said PC to interface with a user and with other electronic medium;

computer code for accepting input and commands and for outputting data;

computer code to execute a process corresponding to said input and commands, said process comprising, accepting input of true geodetic coordinates of an own position (OP);

accepting input of raw coordinates of a reference point (RP);

accepting input of true coordinates of RP from user, said true coordinates of RP being obtained from said image database;

computing exact local magnetic declination variance between said raw coordinates of RP and said true geodetic coordinates of RP;

accepting input of raw coordinates, inclination and range of said target position (TGT);

computing the true geodetic coordinates of TGT utilizing the exact local magnetic declination variance; and outputting the true geodetic coordinates, inclination and range of TGT.

18. The computer program product of claim 17 wherein said portable personal computer (PC) comprises a Compaq (Hewlett-Packard) IPAQ™ model 3650.

19. The computer program product of claim 17 wherein said image database comprises the Digital Point Positioning Database (DPPDB).

20. The computer program product of claim 17 wherein said true geodetic coordinates of said own position (OP) are obtained from said image database, a Global Positioning System (GPS) receiver, an Advanced Targeting Forward Looking Radar (ATFLIR) image, a Low Altitude Navigation and Targeting Infrared for Night (LANTIRN) pod, or the FalconView mapping system.

21. The computer program product of claim 17 wherein said geodetic coordinates are in the World Geodetic System 1984 (WGS-84), the Miltary Grid Reference System (MGRS), or like reference system.

22. The computer program product of claim 17 wherein said raw coordinates of a reference point (RP) and said raw coordinates of target (TGT) are obtained utilizing a Laser Range Finder (LRF).

23. The computer program product of claim 17 wherein said true coordinates of OP and RP are obtained from said image database.

24. The computer program product of claim 17 wherein said true coordinates of OP and RP are obtained from said image database by utilizing the Precision Strike Suite (PSS).

* * * * *